United States Patent
Horn

[15] 3,688,482
[45] Sept. 5, 1972

[54] STRIKER ROD MOUNTING
[72] Inventor: Darrell C. Horn, Lafayette, Calif.
[73] Assignee: Up-Right, Inc., Berkeley, Calif.
[22] Filed: Nov. 11, 1971
[21] Appl. No.: 197,795

[52] U.S. Cl. ................................................. 56/330
[51] Int. Cl. ........................................... A01g 19/00
[58] Field of Search ............. 56/330, 331, 328, 327, 126–130, 56/29, 42, 44, 45, 46

[56] References Cited

UNITED STATES PATENTS

| | | | |
|---|---|---|---|
| 2,657,515 | 11/1953 | Rust | 56/42 |
| 3,066,467 | 12/1962 | Barfield | 56/44 |
| 3,126,693 | 3/1964 | Renn | 56/364 |
| 3,439,482 | 4/1969 | Orton | 56/330 |
| 3,538,694 | 11/1970 | Holloway | 56/330 |

Primary Examiner—Russell R. Kinsey
Attorney—Carlisle M. Moore

[57] ABSTRACT

A mechanical harvesting machine having horizontal striker rods each of which is secured at one end to a vertical, oscillating shaft, the improvement wherein a tubular holder extends through the shaft, projecting from either side thereof. The rod is mounted in the holder with a resilient sleeve between the rod and holder and with the major portion of the length of the rod extending from one end of the holder. The rod is bolted to the holder at the opposite end thereof, on the other side of the shaft.

3 Claims, 4 Drawing Figures

PATENTED SEP 5 1972  3,688,482
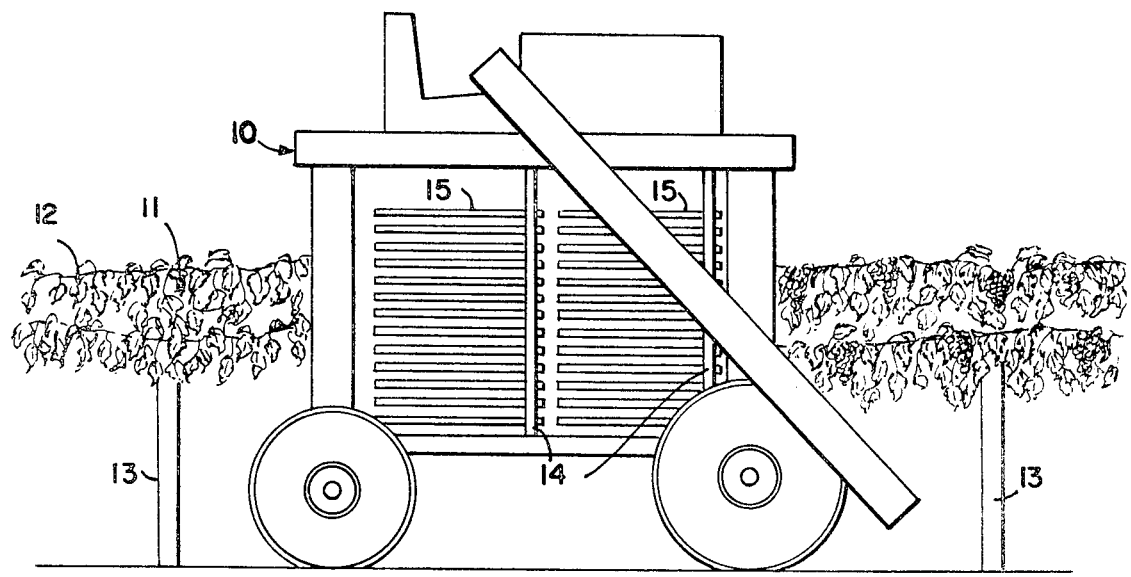
FIG_1
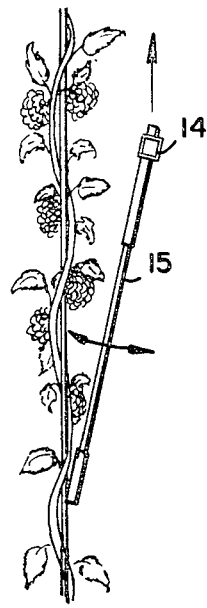
FIG_2
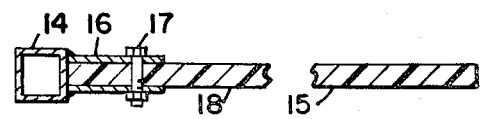
FIG_3
(PRIOR ART)
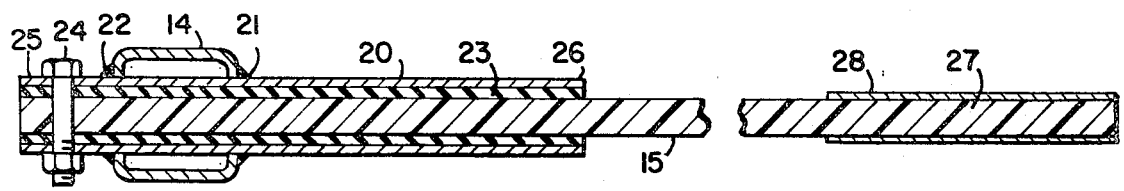
FIG_4
INVENTOR.
DARRELL C. HORN
BY
Carlisle M. Moore
ATTORNEYS

STRIKER ROD MOUNTING

BACKGROUND OF THE INVENTION

This invention relates to the type of mechanical fruit harvester having a plurality of oscillating vertical shafts, each shaft having a plurality of generally horizontal, elongated striker rods mounted at one end on the shafts. As the harvester moves along a row of fruit-bearing plants, the oscillation of the shafts causes the striker rods thereon to swing repeatedly into and out of engagement with the plants and thereby knock or shake the fruit from the plants.

In order to stand up under the abuse to which they are subjected, and in order to strike the plants with efficient harvesting blows, striker rods must have the proper amount or degree of strength, weight, exterior smoothness, toughness and flexibility. Various materials have been tried, and the industry has presently settled upon fiber glass as the most desirable material for such striker rods.

The mounting of such striker rods to the oscillating shafts has been a continual source of problems. The manner in which they are conventionally mounted is illustrated in FIG. 3 of the attached drawings, wherein one end of a rod is inserted into a socket welded to the oscillating shaft; the rod being held in place in the socket by a bolt. If the end of the striker rod is rigidly held in the socket by securely tightening the bolt, then the vibration of the rod, resulting from its being struck against the plants, will be concentrated in the rod adjacent the socket, causing splintering of the rod thereat and early failure. In addition, a rigid mounting of the rod causes considerably more damage by the rod to the posts on which the plants are borne and to the relatively rigid trunks and thick branches of the plants. On the other hand, if the striker rod is held only loosely in the socket, then the vibration of the rod will be imparted to the socket and mounting bolt, causing early failure of the mounting, with a resultant down time to repair the machine.

Thus, with the present manner of mounting striker rods, the operator must choose between expensive down time of the harvesting machine during harvesting or damage to the posts and plants which must then later be repaired.

SUMMARY OF THE INVENTION

The present invention provides a solution to the striker rod mounting problem by utilizing a rigid tubular rod holder which extends through the vertical shaft and projects from either side thereof, by utilizing a resilient sleeve between the holder and the rod and by bolting the rod to the holder at the end of the holder opposite to the free end of the rod.

With this manner of mounting, splintering of the rod, damage to the posts and plants, and damage to the mounting are all minimized.

Other objects and advantages will become apparent in the course of the following detailed description.

BRIEF DESCRIPTION OF THE DRAWINGS

In the drawings forming a part of this application, and in which like parts are designated by like reference numerals throughout the same, FIG. 1 generally illustrates, in side elevation, a mechanical fruit harvester of the type to which the invention is applicable.

FIG. 2 illustrates the manner in which the striker rods of the mechanical fruit harvester strike against the plants being harvested.

FIG. 3 illustrates the prior art manner of mounting striker rods.

FIG. 4 is a central longitudinal sectional view illustrating the manner in which striker rods are mounted in accordance with the present invention.

DESCRIPTION OF THE PREFERRED EMBODIMENT

FIG. 1 depicts generally a harvesting machine 10, designed to straddle and pass down a row of plants, such as grape vines 11 trained on wires 12 supported by spaced posts 13. The harvesting machine has mounted thereon a plurality of vertical shafts 14 which are oscillated by suitable power-driven equipment on the machine. Each shaft has a plurality of vertically spaced, generally horizontal, elongated striker rods 15 mounted thereon. Preferably these rods are made of fiber glass and are typically about 3 feet long and three quarters of an inch in diameter for grape harvesting.

As the harvesting machine moves along the row, the shafts 14 will be translated along the row in the direction of the top arrow in FIG. 2, and the oscillation of each shaft will cause the rods thereon to move in unison towards and away from the plant, as indicated by the lower arrow in FIG. 2, so that the rods strike the plant to dislodge the fruit therefrom.

As previously mentioned, FIG. 3 illustrates the conventional manner of mounting a striker rod 15 to the vertical shaft 14. A tubular socket 16 is welded to the vertical shaft, the rod 15 being inserted into the socket and secured thereto by bolt 17. If the rod is firmly gripped in the socket by bolt 15, vibrational stress in the rod will be concentrated, as at 18, adjacent the end of the socket and will cause splintering of the rod fibers. If the bolt is loosened to avoid such stress concentration, and also to avoid damage to posts and vines, then the rod will vibrate in the socket, causing severe abrasion between the bolt and socket and between the rod and bolt.

FIG. 4 illustrates the manner in which striker rods are mounted in accordance with the present invention. A rigid tubular holder 20 is welded to vertical shaft 14, as at 21 and 22, the holder extending completely through the shaft and projecting from each side thereof. A resilient sleeve 23, such as rubber hose, is disposed within the holder 20, the sleeve having an outer diameter approximately that of the inner diameter of the holder, and an inner diameter approximately that of the diameter of the fiber glass rod 15. The striker rod is inserted into the sleeve and is secured to the holder 20 by bolt 24 at the end 25 of the holder, opposite to the end 26 from which the rod projects.

The free end 27 of the rod 15 is also subject to splintering by its repeated strikes against the plants, and is preferably provided with a thin metal sleeve 28 fixed thereto to prevent such wear.

The resilient sleeve 23 holds the rod relatively firmly in the tubular holder so that in normal operation there will be little play between the rod and holder 20. Thus the rod will be swung back and forth by the oscillating holder with no lost motion therebetween, resulting in efficient striking of the rod against the plant. At the same time, even though the rod is held firmly, it is held resiliently so that vibration in the rod will be absorbed, thus preventing the stress concentration in the rod adjacent the holder which normally would cause splintering.

If the rod is struck against a solid object, such as post 13, the sleeve 23 will cushion the blow and yield slightly so that damage to the post and rod will be minimized.

Thus, with this mounting, the advantages of a loose conventional mounting are obtained, while yet holding the rod in a manner which eliminates free play between the rod and holder. However, the disadvantages of the conventional loose mounting are not present. Some vibrational energy of the rod will be imparted to the holder through the resilient sleeve, but the vibration of the holder will decrease towards the shaft 14. The shaft 14 is considerably more massive than holder 20 and any vibration in holder 20 will be damped out by the shaft so that there is virtually no vibration of the rod or end 25 of holder 20 on the other side of the shaft. As a consequence bolt 24 holds the rod and holder together at the point of least vibration and thus is subject to minimum wear. Virtually the only force on the bolt is the force imposed thereon lengthwise of the rod, resulting from the inertia of the oscillating rod and the dragging action of the rod on the plant as the harvesting machine moves along the plants.

Having thus described my invention, I claim:

1. In a fruit-harvesting machine:
   a. an oscillating shaft,
   b. a tubular holder rigidly secured to and extending through said shaft transversely thereto and projecting from both sides of said shaft,
   c. an elongated striker rod disposed in said tubular holder, said rod having the major portion of its length extending from one end of said holder,
   d. means securing said rod to said holder adjacent the other end of said holder, 2. Apparatus as set forth in claim 1 and further including a resilient sleeve disposed between said rod and said holder.

3. Apparatus as set forth in claim 2, wherein said striker rod is made of fiber glass material.

* * * * *